United States Patent [19]
Bearden

[11] 3,852,384
[45] Dec. 3, 1974

[54] LIQUID TREATMENT APPARATUS

[75] Inventor: John E. Bearden, Minneapolis, Minn.

[73] Assignee: Environmental Technology Corporation, Bloomington, Minn.

[22] Filed: July 21, 1972

[21] Appl. No.: 273,734

[52] U.S. Cl................. 261/77, 210/242, 261/79 A, 261/120, 261/124
[51] Int. Cl............................................... B01f 3/04
[58] Field of Search.... 261/77, 79 A, 120, 123–124, 261/122, DIG. 75; 210/220, 242

[56] References Cited
UNITED STATES PATENTS

| | | | |
|---|---|---|---|
| 2,353,195 | 7/1944 | Sims | 261/77 |
| 3,015,190 | 1/1962 | Arbeit | 261/77 X |
| 3,452,966 | 7/1969 | Smolski | 261/124 X |
| 3,495,384 | 2/1970 | Alliger | 261/79 A X |
| 3,529,725 | 9/1970 | Fifer | 210/220 |
| 3,552,725 | 1/1971 | Ray | 261/120 X |
| 3,628,775 | 12/1971 | McConnell et al. | 210/220 X |

FOREIGN PATENTS OR APPLICATIONS

| | | | |
|---|---|---|---|
| 186,945 | 10/1922 | Great Britain | 261/77 |

Primary Examiner—Tim R. Miles
Assistant Examiner—Richard L. Chiesa
Attorney, Agent, or Firm—Schroeder Siegfried Ryan and Vidas

[57] ABSTRACT

An apparatus for the treatment of liquid in a ponding area by gas is provided wherein an open-ended elongated tube is vertically positioned with its lower end above a gas bubble generator so that gas bubbles are entrained in the liquid and carry the liquid and bubbles up through the tube. A plurality of orifices are provided in the tube walls to draw in liquid from the side portions of the tube at a point above the lower end of the tube to increase the efficiency of the aeration. In the preferred form a helical path is provided within the tube to increase further the time of exposure of the gas to the liquid being treated and to provide a shearing action to minimize bubble size. Also disclosed is an automatically adjustable length for the tube to compensate for the rise and fall of pond depth.

11 Claims, 8 Drawing Figures

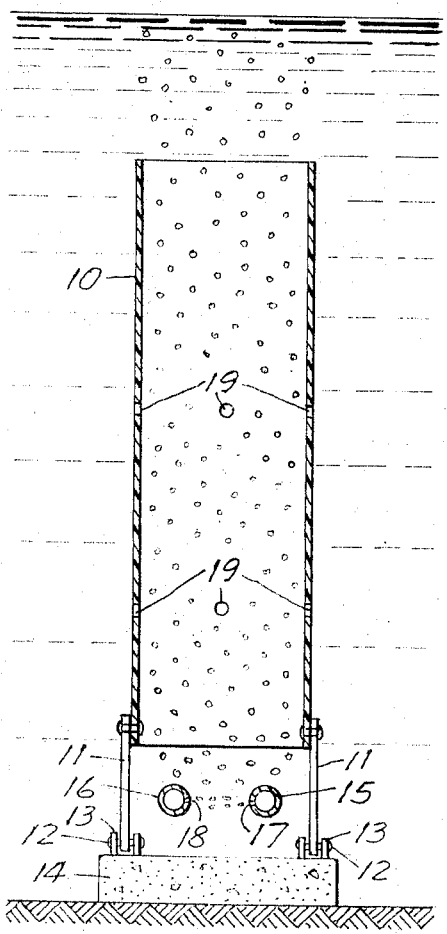
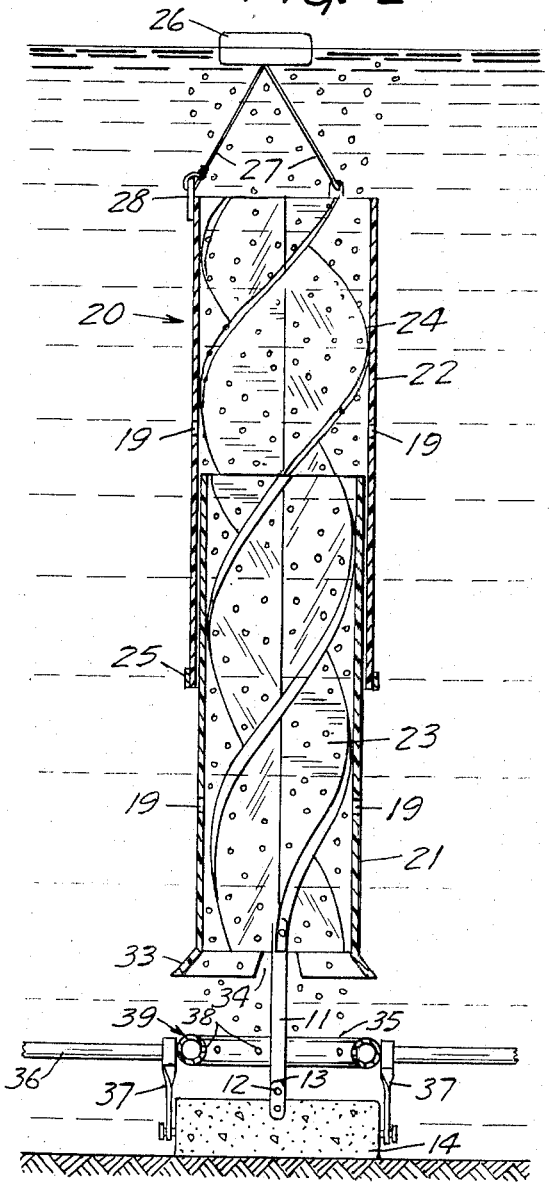
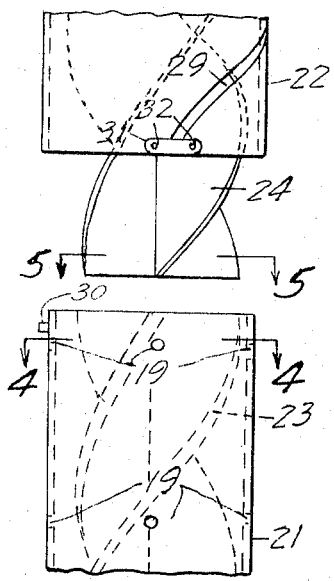
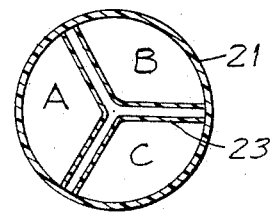
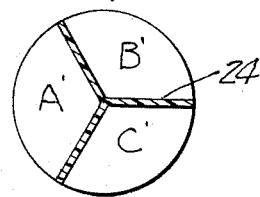
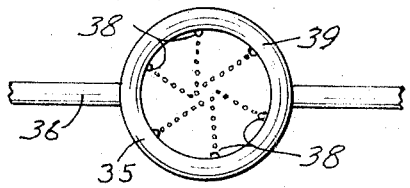
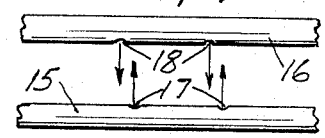

LIQUID TREATMENT APPARATUS

The present invention is directed to apparatus for treating of liquids with gases. More specifically the present invention is directed to an apparatus for efficiently providing aeration of water in a ponding area such as a sewage ponding tank to maintain the oxygen content of the water at a level sufficient to satisfy the biological and chemical oxygen demand (BOD and COD).

It has long been known that aeration as a treatment for sewage is highly desirable. Sewage typically is essentially oxygen free and its dumping into rivers and lakes will deplete the oxygen supply of these areas, killing fish and other marine life, and make the water generally undesirable. In addition anerobic bacteria will operate upon such sewage giving off objectionable odors. The obvious way to accomplish aeration of ponding areas is to place conduits at the lower surface of the pond and pump air through openings in the pipe up through the pond to bring about a saturation with oxygen. This type of system works satisfactorily insofar as injecting oxygen into the water. However, the system is quite inefficient because the bubbles which are so generated rise quickly and unimpededly to the surface of the pond and are lost in the atmosphere with only a small portion of their oxygen being removed by passage through the water. There are modified units of this simple approach on the market which increase the efficiency of oxygen transfer and thus reduce the costs of operating an aeration program. However, the efficiency claimed by the manufacturer for transfer of oxygen from the air is still very low. In accordance with the present invention an improved apparatus is provided which is significantly more efficient in the transfer of oxygen to the holding pond than prior art systems.

It is also desirable in such ponding areas to insure that a thorough mixing of the pond takes place at regular intervals. That is, some means must be provided to prevent stratification of the pond. A technique for accomplishing this purpose has been to provide elongated tubes and bubble the air up through the tubes to provide a pumping action thus circulating the liquid of the pond. This purpose is also provided in accordance with my invention.

IN THE DRAWINGS

FIG. 1 is a cross-sectional view of an apparatus in accordance with the invention shown submerged in a body of water;

FIG. 2 is a cross-sectional view of a preferred form of the invention wherein a first form telescoping tube arrangement is disclosed;

FIG. 3 is a fragmentary view in exploded form showing the upper and lower sections of the apparatus of FIG. 2;

FIG. 4 is a view along the lines 4—4 of FIG. 3;

FIG. 5 is a cross-sectional view of the apparatus of FIG. 3 along lines 5—5;

FIG. 6 is a top elevational view of a bubble generator shown in FIG. 3;

FIG. 7 is a top elevational view of the bubble generator of FIG. 1; and,

Figure 8:
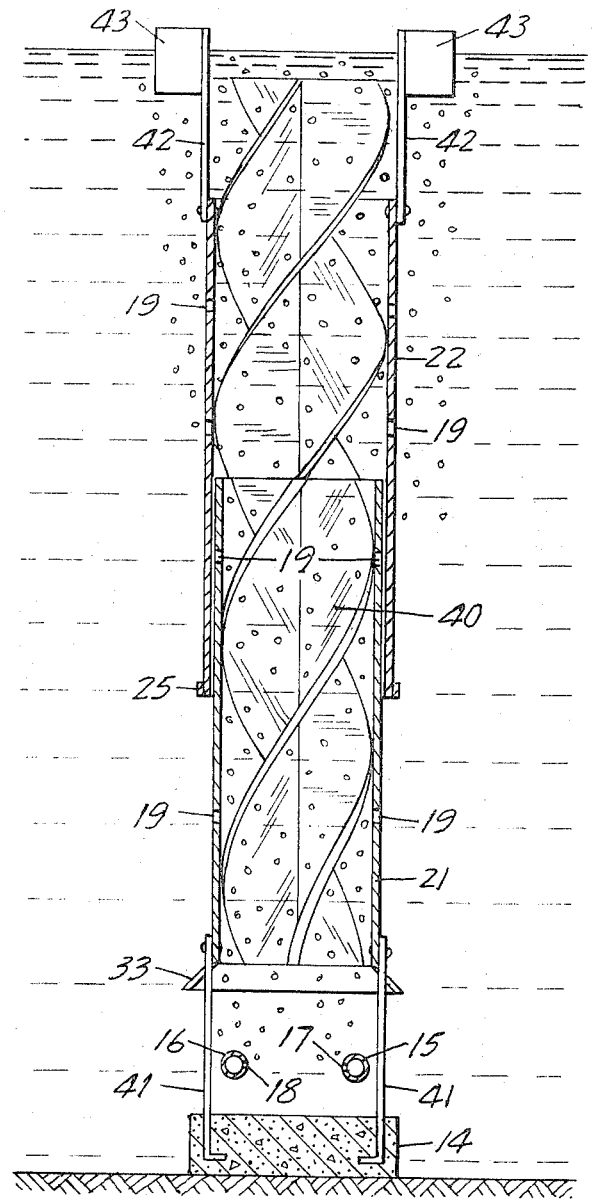
FIG. 8 is a cross-sectional view of a preferred form of a telescoping tube arrangement in accordance with the invention.

Referring first to FIG. 1 there is shown in side cross-sectional view an apparatus in accordance with the invention wherein an elongated tubular body 10 open at each end is shown in vertical orientation in a body of liquid in a ponding area. The vertical orientation is maintained through the means of arms 11 joined to the lower edges of tube 10 and by the natural buoyancy of the tube 10. Arms 11 are shown pivotally mounted at their opposite extremity by means of pin 12 and a clevis member 13 to a block of concrete 14. Tube 10 is desirably formed of a plastic, such as a polyethylene that has a density less than that of water so that it maintains its own vertical orientation by reason of its natural buoyancy. When air is bubbling through the tube this natural buoyancy is reinforced by the effect of the mixture of air and water within the tube.

Spaced beneath the lower opening of tube 10 are air conduit lines 15 and 16. Not shown is the anchoring means to maintain these lines in position beneath the opening and at a predetermined distance above the base of the ponding area. Pipes 15 and 16 are provided with orifices 17 and 18 in the sidewall portions thereof. It has been found that placing the orifices in the sidewall of the tube results in a smaller bubble due to the fact that a flow of liquid is passing upwardly past the orifices and tends to shear off the bubbles as they form making the initial bubbles of somewhat smaller size. As illustrated in FIG. 7 tubes 15 and 16 are positioned so that the orifices 17 and 18 are not in direct opposition but are slightly offset. The offset provides an improved performance in that the stream of bubbles being injected into the fluid produces additional shearing effects for reducing bubble size and swirling to increase the agitation of the water bubble mixture giving a larger gasliquid interface area thereby promoting solution of oxygen into the water. As the bubbles generated at tubes 17 and 18 rise they enter the cavity defined by tube 10 carrying along with them by their air pump action liquid from the lower part of the pond upwardly through tube 10 to the surface. This flowing action provides mixing of the liquid in the pond by removing liquid from the bottom and exhausting it at the top of tube 10.

Initially the liquid of the pond will be at very low oxygen concentration as compared to the saturated condition. Even at the saturated condition the quantity of oxygen dissolvable by water is quite low. However, due to the BOD of the pond the liquid contains essentially zero oxygen concentration initially. The air pumped through the bubble generator on the other hand will initially contain the normal 21 percent oxygen. Transfer of oxygen from the gaseous state in the bubbles into solution in the liquid will thus proceed under optimum conditions of from a relatively high level gas concentration to an essentially zero level dissolved in the water. As the water continues to be exposed to the air bubbles the concentration of oxygen in the air will be declining due to its solution in the liquid while the concentration in the liquid will, of course, be correspondingly rising toward saturation. The rate of solution will thus diminish as the bubble rises. The pumping action will likewise result in a fairly rapid flow of the gas-water mixture through tube 10. In accordance with the invention holes 19 are provided in the walls of tube 10 in spaced relationship both around the circumference of the tube and along the length thereof. The function of holes 19 is to provide an opening wherein liquid in the pond external to tube 10 will be drawn into the interior of tube 10 caused by the upward flow of the liquid air through the interior portions. The introduction of additional liquid through holes 19 provides two positive benefits. First, the introduction of additional liquid through holes 19 slows the passage of air bubbles through tube 10. This is advantageous as the longer the bubbles are exposed to the liquid the greater the transfer of oxygen from the gas state into the dissolved state. A second advantage is that the liquid which is drawn in through openings 19 will be at a lower oxygen content than the liquid rising from the lower opening of the tube 10 that had already been exposed for a period of time to the air bubbles. Thus the oxygen remaining in the bubble (which has been diminished by that amount already solubilized by the water) will more readily transfer to the new liquid mix consisting of the water introduced through openings 19 combined with the liquid being pumped through the center of tube 10 from the lower opening. The net result will be an increase in the efficiency of removal of oxygen from the air that is pumped through the system.

One may also advantageously make use of known features such as an internal helical baffle in tube 10 to divide the tube into two or more compartments and provide a spiraling path for the air-water to follow. Such a path is advantageous as it further aids in slowing the rate of rise of the bubbles through tube 10 and additionally aids in a shearing action to continuously act to break the bubbles into smaller sizes thus increasing the surface area of the water-air mixture.

In aerating ponds it is commonplace that the liquid level within the pond will increase and decrease in depth depending upon a number of factors. At certain times of the year the holding pond level will rise because the treated liquid cannot be disposed of in adjacent rivers due to the low volume of flow in the river. The volume of sewage being treated also varies and likewise causes changes in the amount of liquid being treated in the ponding area. It is desirable that the overall length of tube 10 bear a fixed relationship to the depth of the pond. That is, the tube upper end should be beneath the upper surface of the liquid but relatively close thereto to provide the maximum efficiency of solution of oxygen and stirring of the pond liquid. If pond depth rises and falls significantly it is apparent that a single length tube cannot be effective at maximum efficiency for all depths. Either the tube will be far below the surface with the resultant free rise of bubbles or it will be projecting above the surface of the liquid. In accordance with the preferred form of my invention illustrated in cross-sectional view in FIG. 2 there is provided an aeration system that readily compensates for variations in pond depth in an automatic way such that manual labor is not required to change each of the tubes in an overall system. As treating ponds commonly involve hundreds of units it is highly advantageous to have the tubes of each unit adjustable in length in an automatic manner. Aeration systems of the prior art had tubes that can only be changed to accommodate different pond depths either by draining the pond or by working beneath the sewage surface. The saving in equipment and labor is considerable when using the form of my invention illustrated in FIG. 2.

Turning to FIG. 2 there is illustrated an aerator assembly having an automatically adjusting length. The assembly includes a tubular column generally indicated 20 consisting of a lower portion 21 and an upper portion 22. Upper portion 22 is of larger diameter than the lower portion 21 and is constructed to telescope therewith. The form of FIG. 2 also includes a spiral baffle to increase the travel path for the liquid-air mixture.

As will be explained below tubes 22 and 21 and the spiral baffles are constructed so that they telescope together automatically with the rise and fall of the liquid level in the pond.

Tube 21 and tube 22 are shown in fragmentary and exploded view in FIG. 3 and in cross-sectional view in FIGS. 4 and 5. The discussion which follows will be with reference to FIGS. 2, 3, 4 and 5. It has been found highly advantageous to utilize a helical baffle construction to increase the efficiency of the absorption of oxygen from the gas bubbles by the water. In order to secure such a spiral path for the liquid and bubbles to follow regardless of the extent of telescoping of tubes 21 and 22 there is provided a construction wherein the baffle members in tube 21 are formed to provide an interior channel as illustrated in the cross-section view of FIG. 4. The construction of the baffle members for tube 22 is illustrated in cross-sectional view in FIG. 5.

In tube 21 an interior spiraling baffle construction is provided which is shown schematically illustrated by number 23. The baffle construction is such that it divides the interior of tube 21 into a plurality of separate spiral passages. In the illustration shown in FIG. 4 three passages are provided extending through the length of tube 21 in spiral form. These are identified A, B and C. The telescoping of tube 22 and its spiral divider 24 into the spiral divider 23 is preferably in the manner illustrated. As the liquid is pumped upwardly through assembly 20 any solids that are carried by the liquid will have a tendency to catch upon roughened edges and impede the free movement of the tubes either in lengthening or in retracting the overall length. By arranging the telescoping arrangement as shown there will be far less tendency to clog free movement of the tubes.

As shown in FIGS. 2 and 3 spiral divider 24 extends to the outer walls of tube 22 only over a portion of the length thereof. At the lower portion of tube 22 spiral section 24 is spaced from the wall 19 so as to permit tube 21 to telescope inwardly of walls 22. Tube 21 is telescoped around spiral 24 which telescopes into the interior of member 23. FIG. 3 illustrates in exploded view the nature of the telescoping of the spirals of the two tubes.

As in the case with the description with regard to FIG. 1 tube 21 is provided with a plurality of holes 19 through the outer walls thereof to provide for flow of liquid from the main body of the holding pond into the interior of the tube. These holes are desirably provided at spaced intervals along the length of the assembly and also are included in the lower portions of the tube 22. The purposes and advantages of these openings are the same as in the case of the similar openings in the showing of FIG. 1.

Both tubes 21 and 22 and helical baffles 23 and 24 are desirably made of some corrosion resistant material which will not tend to collect solid debris on the surface thereof. Again, as in the instance of FIG. 1, it has been found that a plastic such as polyethylene is desirable for the construction of the tubes as well as for the construction of the spiral dividers. The normal buoyancy of the tubes will maintain overall assembly 20 in the vertical position as shown. However, when buoyant materials are used it will be necessary to provide a weighting means to tube 22 to insure that it does not float upwardly from tube 21 until it reaches buoyancy equilibrium at the surface of the pond with the upper portions of tube 22 exposed. This can be readily provided by use of a weighted ring 25 of sufficient weight to overcome the buoyancy of tube 22. Ring 25 or equivalent weighting means is also necessary to insure that as the liquid level of the pond falls tube 22 will have sufficient weight to telescope readily into tube 21 to the extent permitted by float 26.

Float 26 which can advantageously be formed of a material such as polystyrene foam of low density is attached by means of cables 27 and flanges 28 to the upper ends of tube 22. The length of cable 27 is selected to maintain a predetermined distance between the upper end of tube 22 and the surface of the pond.

Float 26 will of course have sufficient buoyant power to overcome the sinking effect produced by weights 25. It can thus be readily seen that should the liquid level of the pond illustrated schematically in FIG. 2 rise that float 26 will pull tube 22 partly out of the telescoped relationship that it has to compensate for the rise in the liquid level of the pond. When the pond liquid level declines the float will no longer hold tube 22 from telescoping into tube 21 and under the effect of gravity the tube will re-telescope.

Ordinarily there will be no need to provide a stop to prevent disengagement of tubes 22 and 21 should the pond level rise excessively. Normally ponding areas have an overflow which prevents the depth from exceeding some predetermined maximum. However, one may readily provide a safeguard to prevent unwanted disengagement of the upper tube 22 from lower tube 21. One such means is to merely provide a spiral groove 29 in wall 22 at the telescoping portion with tube 21. The spiral groove would correspond in pitch to the spiraling pitch of dividers 23 and 24. As shown in FIG. 3 such a spiral is illustrated in the upper portion by numeral 29 and a peg means 30 is attached to the outer wall of the lower tube 21. A removable stop means 31 is provided at the lower end of groove 29. It can be releasably fastened by means such as screws 32. One would assembly tubes 22 and 21 by inserting the tubes in a manner so as to engage slot 29 with peg 30. After the engagement stop means 31 would be attached to prevent the undesired disengagement of tubes 21 and 22.

At the lower end of tube 21 there is provided a flared skirt portion 33. Skirt 33 extends substantially around the perimeter of tube 21 with openings 34 provided at opposite sides of tube 21 for introduction of the arms 11 which connect tube 21 to base block 14. As in the description with regard to FIG. 1 arms 11 are pivotally joined to block 14 by means of a clevis 13 and a pin 12. The function of this pivotal mounting is to allow movement of the tube assembly 20 about at least one axis. Alternatively, flexible means such as cable can be utilized to join tube 21 to the base block 14, thereby permitting a limited freedom of movement about the entire 360° axis. Such movement is advantageous when there is a possibility that the upper end of the tube may come in contact with boats or the like that are passing through the ponding area.

Beneath skirt 33 there is placed a bubble generating apparatus 39 which is shown in top-elevational view in FIG. 6. Bubble generating apparatus 39 includes an annular ring 35 which is joined to compressed air conduit 36 which is connected to a source of compressed air (not shown). As illustrated the assembly 39 is mounted by means of straps 37 to be in position spaced above blocks 14. Ring 35 is provided with a plurality of orifices 38 on the interiorly facing edges thereof for injection of the air into the water. These orifices are spaced and angled in such a manner as to provide a swirling action of the liquid-air mixture in the region within the ring. This swirling action aids in diminishing bubble size and in providing agitation for the bubbles and liquid thereby increasing the efficiency of oxygen transfer. As can be readily understood skirt 33 assists in capturing the bubbles created by the generator so that essentially all of the air that is forced from the generator rises up through tube assembly 20.

The operation of my invention in accordance with the preferred form of FIG. 2 substantially follows the description given with regard to FIG. 1. In the instance of the apparatus of FIG. 2 a bubble generator 39 provides improved results by the additional swirling and shearing action resulting from the injection of the air bubbles from the annulus. These bubbles are trapped so as to pass through tube assembly 20 by the skirt 33 and create a pumping action as they rise through the tube. Orifices 19 again provide a source of flow of liquid from the bulk of the pond of lower oxygen content than the already partially oxygenated water rising through the column and further increase the efficiency. As has been previously described the telescoping arrangement insures maximum efficiency due to the automatic lowering and raising of the upper portion of the tube assembly 20.

Various modifications can be made within the concepts which have been previously described. For example, when utilizing the telescoping tube concept as described in detail in regards to FIG. 2 a somewhat simpler form of construction can be used. The cylindrical tubes 21 and 22 would telescope in the manner described. However, rather than having the helical baffles telescope into one another as described with regards to FIGS. 2, 3, 4 and 5 one may construct a helical baffle so that it is coextensive with and joined to one tube and extends markedly outwardly beyond the end of this tube. The portion that extends beyond the first tube slidably fits within the second tube and provides a baffle therefore. As illustrated in FIG. 3 the helical baffle member 24 does so extend a distance beyond the end of the tube. By having the helical baffle extend substantially the full distance of the combined length of the telescoping tubes in the closed telescope position it will perform the function of a dividing baffle for both tubes. When the level of the pond changes and the length of the telescoping arrangement becomes longer a "free" region will exist where there is not a baffle. However, a major portion of the advantages of having a baffle are still retained.

Another alternate construction is to provide a helical baffle which is attached in one tube and extends beyond into the interior of the second tube with the second tube being occupied by the helical baffle extension for a portion of its length when the telescope action is closed. A second helical baffle fixed to the walls of the second tube would complete a helical path throughout the tubes. The two baffles in the closed condition could either be in butting relationship or at a cross-angled position relative to one another. As the tubes lengthen due to changing in the level of the pond a "free" area would again exist between the two helical members where there was no helical baffle. However, in this type of a construction the liquid which has been swirling through the tube with the first helical baffle would be engaged by a second helical baffle member after the "free" zone to again accomplish the desired purposes of the helical baffle arrangement.

Referring now to FIG. 8 there is illustrated in a side cross-sectional view the preferred form of my invention utilizing a telescoping tube arrangement. In FIG. 8 like parts corresponding to parts in the other views are given the same numerical deisgnation.

In the form of my invention in FIG. 8 lower tube 21 has mounted interior thereto a helical member 40 which is of an outer diameter such that it is in contact with and joined to the walls of tube 21. Helical member 40 extends upwardly beyond the upper end of tube 21 and is slidably engaged by tube 22. The outermost extremities of member 40 are of a larger diameter at the region above the upper end of tube 21 so as to compensate for the wall thickness of tube 21. That is, member 40 has been given a somewhat larger diameter at its upper regions so as to more closely approximate the interior diameter of tube 22.

Tube 22 slidably extends over the outer diameter of tube 21 and also over the upper portions of tube 40. A buoyancy member 43 is joined by means of bracket members 42 to the upper end of tube 22 at diametrically opposed sides thereof. Member 43 may conveniently be a material such as polystyrene foam. Buoyancy ring 43 maintains the telescoping relationship such that the upper end of tube 22 is at some predetermined distance below the surface of the pond. As illustrated in FIG. 8 tube 22 is partially telescoped around tube 21 and telescoped with relationship to helical member 40 so that a portion of member 40 actually extends outwardly beyond the upper ends of tube 22. When the level of the pond rises buoyancy member 43 will pull tube 22 upwardly so as to increase the overall length of the tubular portion for the purposes described heretofore with regard to the showing of FIG. 2. As in the instance of the earlier descriptions tubes 21 and 22 are provided with a plurality of openings 19 extending through the wall portions thereof to communicate with the interior. These openings function as described with regard to the earlier figures. Stop means may be provided for limiting the extent of travel of tube 22 and its telescoping action. Such stop means are not necessary in this preferred form of my invention as the upper portions of helical member 40 will restrain tube 22 from moving out of engagement with the balance of the assembly.

Attention is also drawn to the mounting arrangement for the lower part of tube 21. In accordance with the figure mounting brackets 41 are rigidly joined both to tube 21 and to anchor block 14. Where it is desired that the aeration tubes always have a vertical stance regardless of the level of the pond such a construction is desirable. For certain purposes it will facilitate servicing and the like when the pond is drained.

I claim:

1. In an apparatus for aerating a liquid in a treatment pond comprising, a submerged vertically positioned open ended elongated tube, said tube having a plurality of smooth openings in the wall thereof and spaced along the extent of the wall intermediate the ends thereof, said openings providing for liquid communication between the interior of said tube and the main body of liquid in the pond; a helical baffle positioned longitudinally in the interior of said tube to provide at least two tortuous passages therein with said openings in said wall of the tube being positioned to provide communication between the exterior of the tube and each of said passages; and a gas bubble generator disposed beneath the lower end of said tube and adapted to be anchored with said tube on the bottom of said pond, said generator discharging bubbles into the liquid of said pond and being constructed and arranged to discharge streams of bubbles in generally opposed directions so as to produce a shearing action therebetween as the bubbles engage one another and to produce an upward flow of liquid and bubbles through the interior of said tube and into the tortuous passages of the baffle therein, said upward flow of liquid and bubbles inducing additional flow of liquid from the pond through the openings in the wall of said tube.

2. An apparatus in accordance with claim 1 wherein the lower end of said tube has a flared collar region for collecting bubbles and directing same into the interior regions of said tube.

3. Apparatus in accordance with claim 1 wherein said bubble generator conduit means includes an annular ring and said orifices are on the interior side walls of said ring.

4. Apparatus in accordance with claim 1 wherein said bubble generator includes two spaced parallel conduits and said orifices are spaced along the side walls of said conduits with pairs of orifices cooperating to produce a swirling and shearing action therebetween.

5. In an apparatus for aeration of liquid in a treating pond comprising, an open ended submerged vertically positioned elongated tube assembly including first and second telescoping tube members, flotation means connected to the upper end of the first tube member for maintaining a predetermined distance between the surface of the pond and the upper end of said first tube member, a gas bubble generator disposed beneath the lower end of said second tube member and having orifices therein to discharge bubbles in a direction transverse to the extent of said tube assembly and into the liquid of the pond whereby to produce the shearing of said bubbles and an upward flow of liquid and bubbles through the interior of said tube assembly, said flotation means for maintaining the predetermined distance between the upper end of said first tube member and the surface of said pond including a float member and linkage means joined to said float means and to said first tube member of a length to maintain said predetermined distance.

6. Apparatus in accordance with claim 5 wherein at least one of said tube members has a helical baffle extending longitudinally of the interior of said tube to define at least two tortuous passages through said tube.

7. Apparatus in accordance with claim 5 wherein the first of said tube members has a helical baffle member mounted to the inner walls and extending therethrough beyond one end thereof, the second of said tubes telescoping around the portion of said helical member extending beyond said first tube member and at least a portion of said first tube member.

8. Apparatus in accordance with claim 7 wherein the outer diameter of said helical baffle member extending beyond said first tube member has a diameter corresponding to the inner diameter of said second tube member.

9. Apparatus in accordance with claim 5 wherein each of said tube members defines a plurality of openings in the wall portions thereof intermediate the ends thereof, said openings providing a liquid communicating means between the interior of said tube members and the main body of liquid in a pond.

10. The apparatus in accord with claim 5 in which each of said tube members have helical baffle members mounted on the inner walls thereof, oen of which baffle member is hollow to receive the baffle member of the other tube member and with the tube members and the baffle members therein being fitted together and movable in a telescopic relationship.

11. The apparatus in accordance with claim 5 and including means positioned in part on each of said tube members to prevent separation of said tube assembly.

* * * * *